(12) United States Patent
Bell et al.

(10) Patent No.: US 9,313,283 B2
(45) Date of Patent: Apr. 12, 2016

(54) DYNAMIC SOCIAL NETWORKING CONTENT

(71) Applicant: International Business Machines Corporation, Armonk, NY (US)

(72) Inventors: Denise A. Bell, Austin, TX (US); Lisa Seacat DeLuca, San Francisco, CA (US); Jana H. Jenkins, Raleigh, NC (US); Jeffrey Alan Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 13/803,774

(22) Filed: Mar. 14, 2013

(65) Prior Publication Data

US 2014/0280534 A1    Sep. 18, 2014

(51) Int. Cl.
| | |
|---|---|
| *H04L 15/16* | (2006.01) |
| *H04L 29/08* | (2006.01) |
| *H04L 12/58* | (2006.01) |
| *H04L 29/06* | (2006.01) |
| *H04W 4/20* | (2009.01) |
| *G06Q 10/10* | (2012.01) |
| *G06Q 30/02* | (2012.01) |
| *G06Q 50/00* | (2012.01) |

(52) U.S. Cl.
CPC ............... *H04L 67/22* (2013.01); *H04L 51/00* (2013.01); *H04L 51/12* (2013.01); *H04L 65/403* (2013.01); *H04W 4/206* (2013.01); *G06Q 10/10* (2013.01); *G06Q 10/107* (2013.01); *G06Q 30/02* (2013.01); *G06Q 50/01* (2013.01)

(58) Field of Classification Search
None
See application file for complete search history.

(56) References Cited

U.S. PATENT DOCUMENTS

| 7,890,593 B2 * | 2/2011 | Chen ................... G06Q 10/107 709/206 |
| 8,346,878 B2 | 1/2013 | Bhogal et al. |
| 2007/0106736 A1 * | 5/2007 | Shepherd ............. G06Q 10/107 709/206 |

(Continued)

*Primary Examiner* — Ranodhi Serrao
*Assistant Examiner* — James Fiorillo
(74) *Attorney, Agent, or Firm* — Brian J. Colandreo, Esq.; Jeffrey T. Placker, Esq.; Holland & Knight LLP

(57) ABSTRACT

A method, computer program product, and system for performing a dynamic social content selection. According to an embodiment, a method may include determining, via one or more computing devices, a plurality of status indicators available to be associated with social content associated with a first user. The method may also include defining one or more rules for the plurality of status indicators based on, at least in part, a recipient characteristic. The method may further include selecting one of the plurality of status indicators to associate with the content for a second user based on the one or more rules. The method may further include providing the content and the selected one of the plurality of status indicators to the second user.

14 Claims, 5 Drawing Sheets

(56) References Cited

U.S. PATENT DOCUMENTS

| | | |
|---|---|---|
| 2007/0244977 A1 | 10/2007 | Atkins |
| 2008/0040435 A1 | 2/2008 | Buschi et al. |
| 2010/0228826 A1* | 9/2010 | Marlow ................ H04L 12/581 709/204 |
| 2010/0293105 A1 | 11/2010 | Blinn et al. |
| 2011/0047479 A1* | 2/2011 | Ghosh .................. G06Q 10/109 715/747 |
| 2011/0047508 A1* | 2/2011 | Metzler ................ G06F 19/322 715/810 |
| 2011/0061001 A1 | 3/2011 | Jones et al. |
| 2011/0113109 A1* | 5/2011 | LeVasseur ............. H04L 51/12 709/206 |
| 2011/0197224 A1 | 8/2011 | Meijer |
| 2012/0069131 A1* | 3/2012 | Abelow ................ G06Q 10/067 348/14.01 |
| 2013/0080579 A1* | 3/2013 | Gordon ................. H04L 65/608 709/217 |
| 2013/0311562 A1* | 11/2013 | Platt ...................... H04L 65/403 709/204 |
| 2013/0339449 A1* | 12/2013 | Morin ................ G06F 17/30905 709/204 |
| 2014/0143004 A1* | 5/2014 | Abhyanker .......... G06Q 10/087 705/7.19 |
| 2014/0143337 A1* | 5/2014 | McIntosh ............... H04L 67/22 709/204 |
| 2014/0280617 A1* | 9/2014 | Nilsson ................... H04L 51/32 709/206 |

* cited by examiner

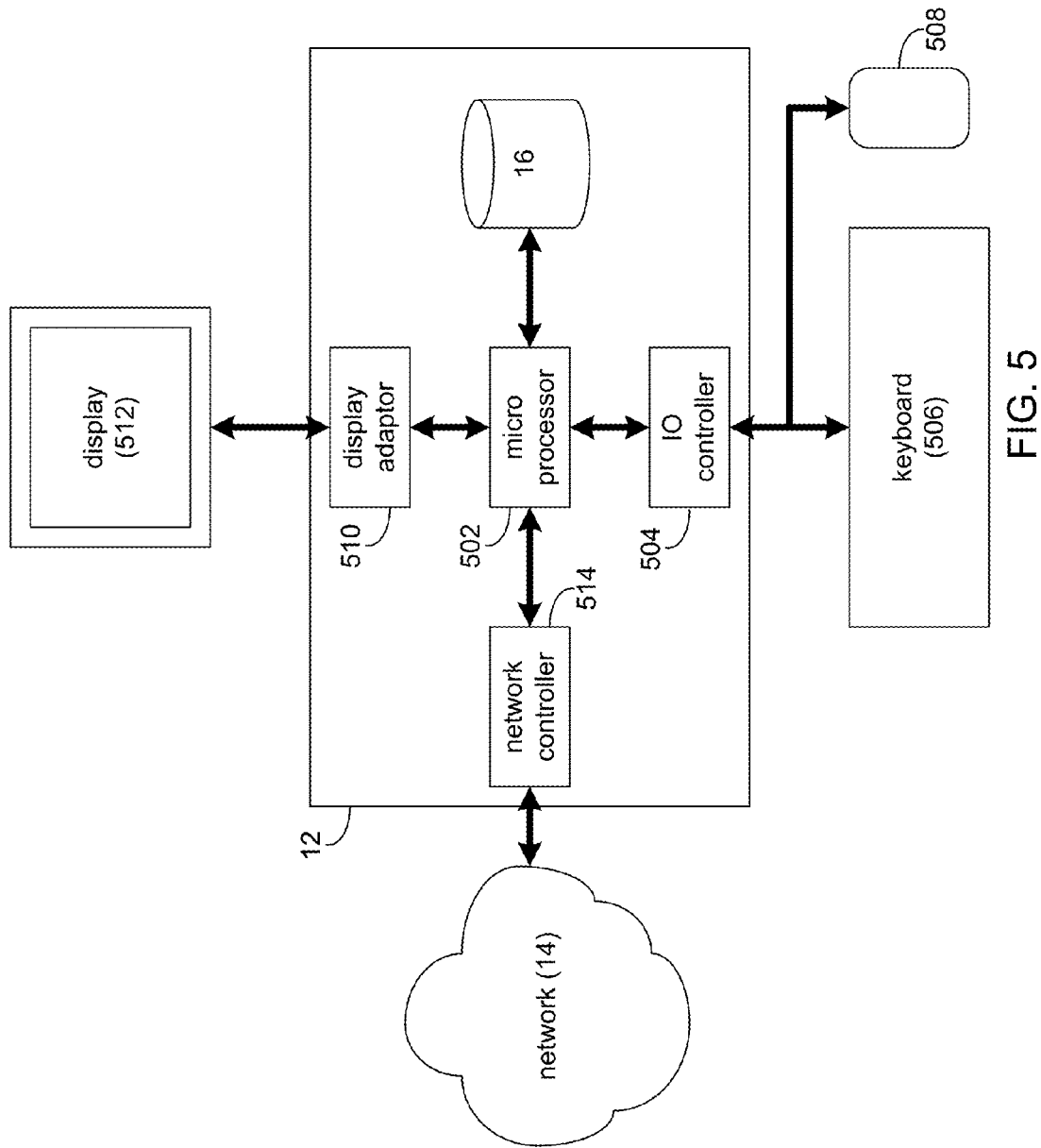

DYNAMIC SOCIAL NETWORKING CONTENT

TECHNICAL FIELD

This disclosure relates to electronic communication.

BACKGROUND

Various collaborative communications platforms exist that may allow users of the system to communicate with one another for various purposes. For example, such systems may support multi-party communications, such as conference calls, web-conferences, virtual meetings, and the like. As is sometimes the case, a party may want to control the content being shown to another party. In some circumstances, the other party's characteristics may control what social content may be displayed.

BRIEF SUMMARY OF THE DISCLOSURE

According to a first aspect of the disclosure, a computer-implemented method includes determining, via one or more computing devices, a plurality of status indicators available to be associated with social content associated with a first user. The method also includes defining one or more rules for the plurality of status indicators based on, at least in part, a recipient characteristic. The method further includes selecting one of the plurality of status indicators to associate with the content for a second user based on the one or more rules. The method further includes providing the content and the selected one of the plurality of status indicators to the second user.

One or more of the following features may be included. The content may include one of an instant message, an instant message status update, an email message, an email signature, and a social networking status update. The recipient characteristic may include a status of the second user. The recipient characteristic may include a number of times the second user views the content. Selecting of the plurality of status indicators may include identifying one or more exceptions based on the second user. The one or more exceptions may be based on, at least in part, one of a role of the second user, a group association of the second user, an identity of the second user, a demographic of the second user, and a relationship between the first user and the second user. The one of the plurality of status indicators may be selected in response to the second user viewing the content one or more times. The one of the plurality of status indicators may be selected when the content is sent to second user.

According to another aspect of the disclosure, a computer program product resides on a computer readable storage medium and has a plurality of instructions stored on it. When executed by a processor, the instructions cause the processor to perform operations including determining a plurality of status indicators available to be associated with social content associated with a first user. Instructions may be included for defining one or more rules for the plurality of status indicators based on, at least in part, a recipient characteristic. Instructions may be included for selecting one of the plurality of status indicators to associate with the content for a second user based on the one or more rules. Instructions may be included for providing the content and the selected one of the plurality of status indicators to the second user.

One or more of the following features may be included. The content may include of an instant message, an instant message status update, an email message, an email signature, and a social networking status update. The recipient characteristic may include a status of the second user. The recipient characteristic may include a number of times the second user views the content. Selecting of the plurality of status indicators may include identifying one or more exceptions based on the second user. The one or more exceptions may be based on, at least in part, one of a role of the second user, a group association of the second user, an identity of the second user, a demographic of the second user, and a relationship between the first user and the second user. The one of the plurality of status indicators may be selected in response to the second user viewing the content one or more times. The one of the plurality of status indicators may be selected when the content is sent to second user.

According to another aspect of the disclosure, a computing system includes at least one processor device and at least one memory architecture coupled with the at least one processor. The computing system also includes a first software module executable by the at least one processor and the at least one memory architecture. The first software module is configured to determine a plurality of status indicators available to be associated with social content associated with a first user. The computing system also includes a second software module executable by the at least one processor and the at least one memory architecture. The second software module is configured to define one or more rules for the plurality of status indicators based on, at least in part, a recipient characteristic. The computing system also includes a third software module executable by the at least one processor and the at least one memory architecture. The third software module is configured to select one of the plurality of status indicators to associate with the content for a second user based on the one or more rules. The computing system also includes a fourth software module executable by the at least one processor and the at least one memory architecture. The fourth software module is configured to provide the content and the selected one of the plurality of status indicators to the second user.

One or more of the following features may be included. The content may include one of an instant message, an instant message status update, an email message, an email signature, and a social networking status update. The recipient characteristic may include a status of the second user. The recipient characteristic may include a number of times the second user views the content. Selecting of the plurality of status indicators may include identifying one or more exceptions based on the second user. The one or more exceptions may be based on, at least in part, one of a role of the second user, a group association of the second user, an identity of the second user, a demographic of the second user, and a relationship between the first user and the second user. The one of the plurality of status indicators may be selected in response to the second user viewing the content one or more times. The one of the plurality of status indicators may be selected when the content is sent to second user.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 5 is a diagrammatic view of the computing device of FIG. 1, according to an implementation of the present disclosure;

Like reference symbols in the various drawings indicate like elements.

DETAILED DESCRIPTION OF THE PREFERRED EMBODIMENTS

According to some example implementations consistent with the present disclosure, users of the Internet may want to control social content that is sent and displayed to recipient. For example, social networking users may want to allow certain users to receive one version of social networking content and other users to receive another version of that the content. Since the internet is a dynamic environment, users expect to see changing content in order to pique their interest. Blogs that are updated on a regular basis may often result in more followers and participation. Similarly, email users may want to provide certain aspects of their email messages with a dynamic quality. For example, in some embodiments, email composition may allow users to utilize a dynamic or changing signature. It is even possible to point to an html file hosted outside of the email client to add a more dynamic signature. Different signatures may be used for different recipients of email messages from the user, or even different recipients of the same email from a user. For example, an email composition may be tailored to a certain recipient, however, that email composition may be inappropriate for other recipients. Similarly, in some embodiments the viewing behavior of a recipient may account for the actual display of the social content. Such dynamic, or variable, content may be similarly implemented in connection with other social content, such as instant messaging, social media, and the like.

Figure 1:
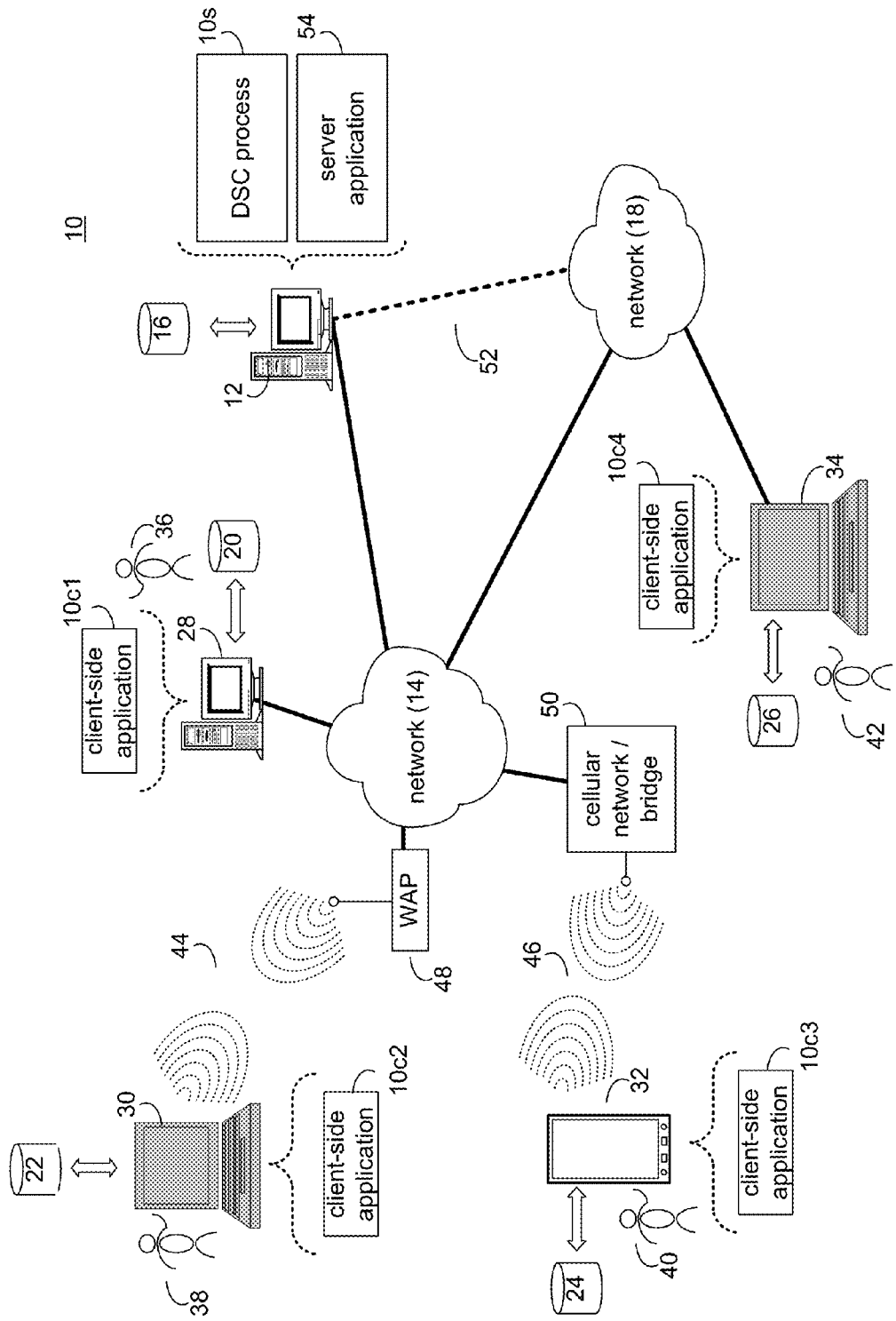
FIG. 1 is a diagrammatic view of a dynamic social content process coupled to a distributed computing network.

Referring to FIG. 1, there is shown a dynamic social content (DSC) process 10. For the following discussion, it is intended to be understood that DSC process 10 may be implemented in a variety of ways. For example, DSC process 10 may be implemented as a server-side process, a client-side process, or a hybrid server-side/client-side process.

For example, DSC process 10 may be implemented as a purely server-side process via DSC 10s. Alternatively, DSC process 10 may be implemented as a purely client-side process via one or more of client-side application 10c1, client-side application 10c2, client-side application 10c3, and client-side application 10c4. Alternatively still, DSC process 10 may be implemented as a server-side/client-side process via DSC process 10s in combination with one or more of client-side application 10c1, client-side application 10c2, client-side application 10c3, and client-side application 10c4. In such an example, at least a portion of the functionality of DSC process 10 may be performed by DSC 10s and at least a portion of the functionality of DSC process 10 may be performed by one or more of client-side application 10c1, 10c2, 10c3, and 10c4.

Accordingly, DSC process 10 as used in this disclosure may include any combination of DSC process 10s, client-side application 10c1, client-side application 10c2, client-side application 10c3, and client-side application 10c4.

Figure 2:
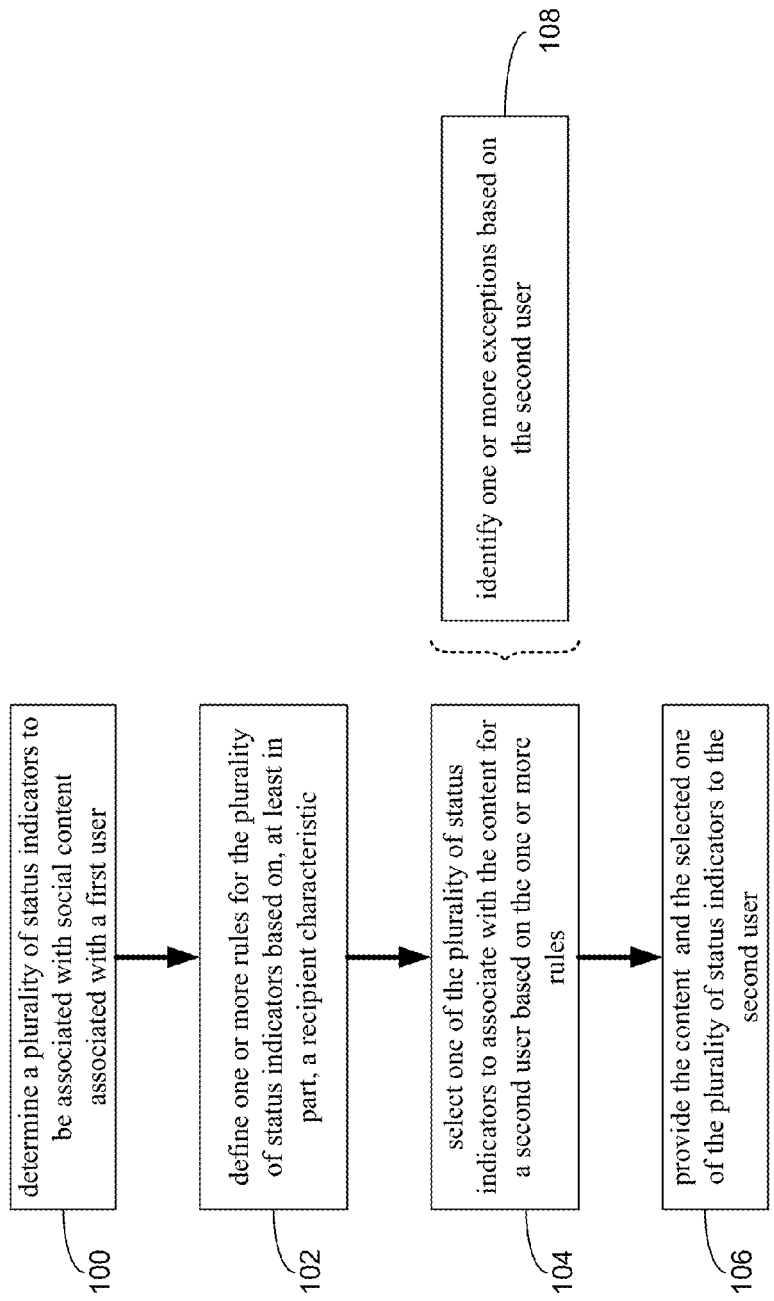
FIG. 2 is a flowchart of a process executed by the dynamic social content process of FIG. 1.

Referring also to FIG. 2, and as will be discussed in greater detail below, DSC process 10 may determine 100 a plurality of status indicators available to be associated with social content associated with a first user. DSC process 10 may also define 102 one or more rules for the plurality of status indicators based on, at least in part, a recipient characteristic. DSC process 10 may select 104 one of the plurality of status indicators to associate with the content for a second user based on the one or more rules. DSC process 10 may also provide 106 the content and the selected one of the plurality of status indicators to the second user.

DSC process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of DSC process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a communication application (such as an email client application, an instant messaging client application, a social networking client application, or the like), or a specialized application. The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a notebook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access DSC process 10 directly through network 14 or through secondary network 18. Further, DSC process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wirelessly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 44 between laptop computer 30 and WAP 48. Additionally, personal computer 34 is shown directly coupled to network 18 via a hardwired network connection.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 28, 30, 32, 34 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

In some embodiments, DSC process 10 may communicate with, interact with, and/or include a component or module of server application (e.g., server application 54). In an embodiment, server application 54 may facilitate communications and/or social interaction between users. For example, server application may allow for the authoring, posting, or sharing of communications, collaboration content, social media content, or the like via test framework application 54, a client application (e.g., one or more of client applications 10c1-10c4, which may include web browsers and/or other suitable applications). One or more of users 36, 38, 40, 42 may access server application 54 via one or more respective client electronic devices (e.g., client electronic devices 28, 30, 32, 34) to engage in social interaction, etc. For example, server application 54 may include a social networking server application that may allow users of the social networking application to post content, e.g., to a user profile page, a public user page, a shared space, etc. In another example, server application may include a communication server application, such as an email server application, an instant messaging server application, or the like, which may allow users to create and exchange communications with one another. Server application 54 may include various additional/alternative communication, collaboration, or social interaction applications that may allow for communication or social interaction of users and/or the sharing of information or content among users.

Referring to FIG. 2, and as will be discussed in greater detail below, DSC process 10 may determine 100 a plurality of status indicators available to be associated with social content associated with a first user. DSC process 10 may also define 102 one or more rules for the plurality of status indicators based on, at least in part, a recipient characteristic. DSC process 10 may select 104 one of the plurality of status indicators to associate with the content for a second user based on the one or more rules. DSC process 10 may also provide 106 the content and the selected one of the plurality of status indicators to the second user.

As generally discussed above, DSC process 10 may generally define a number of rules that may be applied to social networking content. For example, a user who intends to send an email to his or her employer may want that content to portray specific aspects that are appropriate for the employer to see. The same specific aspects associated with the social networking content may be dynamically updated and represented to another user (e.g., a spouse) based on the rules or on the recipient characteristics. In some implementations, DSC process 10 may generally rely on recipient characteristics in order to dynamically adjust the content. Recipient characteristics may include, recipient demographics, group association, relationship to certain users, age, gender, spoken language, or any other identifying characteristics. For example, users belonging to a certain age group may receive different versions of the same content. In other implementations, DSC process 10 may rely on recipients' behavior in order to alter the social networking content. For example, the viewing behavior of the recipient may account for what gets displayed to that recipient.

For example, a user (e.g., user 36) may create or author (e.g., using computing device 28) social content (e.g., social content 300), which may, ultimately, be provided for consumption by one or more other user (e.g., users 38, 40 who may respectively consume social content 300 using computing devices 30, 32). Social content 300 may generally be any content created by a user (e.g. user 36) to be sent to, or viewed or accessed by one or more other users (e.g., users 38, 40). Examples of social content may include, but are not limited to, instant messages, instant message status updates, email messages, email signatures, social networking status updates, blogs posts, or the like. A user may generate social content using a suitable application, e.g., depending upon the form of the social content.

DSC process 10 may determine 100 a plurality of status indicators (e.g., status indicator 302) available to be associated with social content associated with a first user. For example, and referring also to FIG. 3, DSC process 10 may determine 100 a status indicator (e.g., status indicator 302) available to be associated with social content (e.g., social content 300) created by a user (e.g., user 36). It is understood that status indicator 302 may be any one of the plurality of status indicators S1 to Sk, where k is a finite number or any combination thereof. In general, a status indicator may include a component of social content that may, for example, be automatically added to social content created by a user. For example, a status indicator may be an electronic signature, a textual representation, a business object, or a visual indicator that may be added to social content created by a user. An electronic signature (e.g., such as an email signature) may be added to social content which may take the form of communications (e.g., emails, instant messages, or the like) and may be a representation of user 36's personal signature, or a job title or any equivalent signature that is associated with user 36. A textual representation may be a quote, a tagline, or saying that a user (e.g. user 36) may associate with a social content (e.g., social content 304) such as a social networking status update or posting, a blog posting, etc., created by the user. A business object may include, for example, information regarding a product, service, or commercial offering that may be added to an email message, an instant message, a social networking status update or posting, block posting or the like created by the user. A visual indicator may be a graphical representation, or feature, such as a picture, or an animation, or a figure that may be added to social content created by the user. It is understood that the above are only examples and other status indicators may be used. In some embodiments, a status update may include a combination of one or more of an electronic signature, a textual representation, a business object, and a visual indicator. For example, an electronic signature may include a textual representation and a visual indicator, etc. Social content may be a content that is displayed on user 36 device (e.g., client electronic device 28). While the social content is shown to be displayed on a user device (e.g., client electronic device 28), it will be appreciated that this is not a limitation but only for illustrative purposes. It is understood that the above are only examples and the DSC process 10 may be performed by other means.

In various embodiments, status indicators may be defined or created by a user. For example, the user may create the status indicator (e.g., using a text or graphics editor or creation application, or the like), or may provide a pointer to a location of a previously created (e.g., by the user and/or by another individual) status indicator. In an embodiment, DSC process 10 may determine 100 the plurality of status indicators based on, for example, a pointer or identification of a storage location of the plurality of status indicators. For example, user 36 may designate (e.g., via a suitable user interface) a location (e.g., on storage device 20 or storage device 16) of the plurality of status indicators. In some embodiments, DSC process 10 may specify a storage location where status indicators associated with a user (e.g., user 36) should be stored. DSC 10 may, accordingly, determine the plurality of status indicators associated with the user based on the storage location, file format, etc. for the status indicators.

Figure 3:
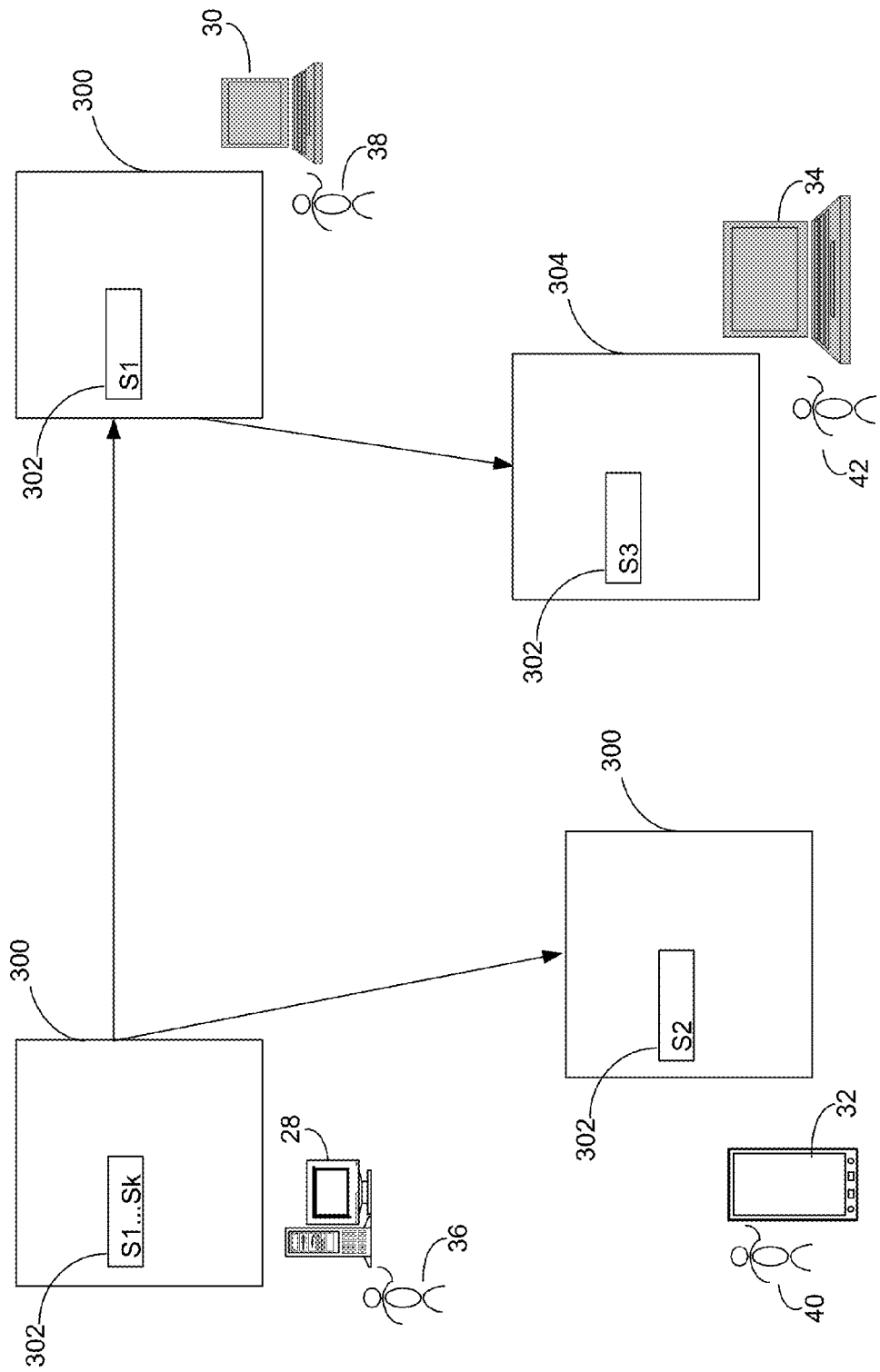
FIG. 3 is a diagrammatic view of an aspect of an implementation of the dynamic social content process.

DSC process 10 may define 102 one or more rules for the plurality of status indicators based on, at least in part, a recipient characteristic, and may select 104 one of the status indicators to associate with the content for a second user based on the one or more rules. For example, as shown in the example of FIG. 3, user 36 may author an instant message (e.g., social content 300), which he may intend to send to user 38 and user 40, who each may include recipients of the social content (e.g., instant message in the illustrative example). DSC process 10 may define 102 one or more rules associated with status indicators 302 (including the plurality of status indicators S1 through Sk) based on, at least in part a characteristic of user 38 and/or user 40. The one or more rules may, at least in part, define criteria for associating a respective one of status indicators S1 through Sk with each of recipient second users 38 and 40. The one or more rules may be defined 102 based on, at least in part, recipient characteristics. As such, one or more rules may be defined for each recipient of the social content. DSC process 10 may define 102 the one or more rules based on, for example, a user provided criterion (e.g., provided by the creator of the social content), and/or based on one or more default rules that may be established for associating status indicators with the social content for different recipients.

DSC process 10 may select 104 one or the plurality of status indicators to associate with the social content for a second user based on the one or more rules. Continuing with the illustrated example of FIG. 3, DSC process may select 104 a respective status indicator to associate with social content 300 (e.g., an instant message) to be received by each of user 38 and 40. For example, DSC process 10 may select 104 status indicator S1 to associate with the copy of the instant message directed to user 38, and may select 104 status indicator S2 to associate with the copy of the instant message directed to user 40. DSC process 10 may provide 106 the content and the selected one of the plurality of status indicators to the second user. For example, DSC process 10, alone and/or in combination with server application 54 and/or one or more of client applications 10c1-10c4, may provide 106 the instant message 300 containing a status indicator 302 (e.g., status indicator S1) associated with the instant message to user 38, and may also provide 106 the instant message 300 containing a status indicator 302 (e.g., status indicator S2) associated with the instant message to user 40. As such, each user (i.e., user 38 and user 40) may see a different status indicator 302 (e.g., status indicators S1 and S2) associated with the instant message.

In an embodiment, user 38 may modify social content 300 to a different or a variation of social content 300 (e.g. to produce social content 304). For example, user 38 may forward the instant message (e.g. social content 300) or a variation of the instant message (e.g., social content 304) to another user (e.g., user 42). DSC process 10 may select 104 one of the plurality of status indicators (e.g. status indicator S3) to associate with user 42 based on, at least in part, one or more rules for the plurality of status indicators. Further, DSC process 10 may provide 106 the content (e.g., instant message 304) and the selected status indicator (e.g., status indicator S3) to user 42. User 42 may see a different status indicator 302 (e.g., status indicator S3) associated with the forwarded instant message (e.g., social content 304). While in the foregoing example, each recipient of the social content was provided with the social content including a different status indicator, in some embodiments, based on the one or more rules, the same status indicator may be selected for more than one of the second users.

Figure 4:
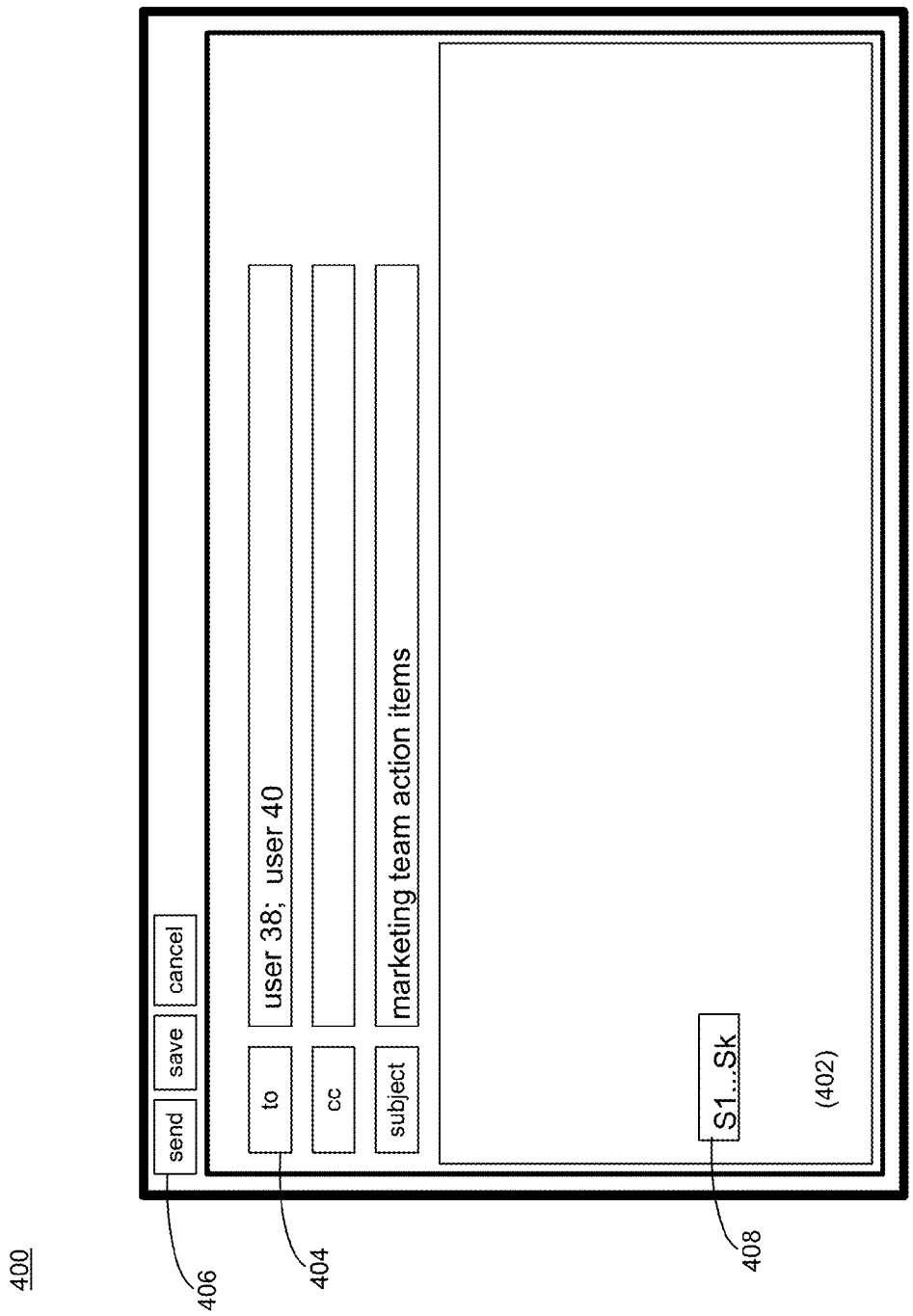
FIG. 4 is a diagrammatic view of an aspect of an implementation of a directed acyclic diagram.

Referring also to FIG. 4, an email client application (e.g., client application 10c1) running on a user electronic device (e.g., electronic device 28) may allow an email user (e.g., user 36) to compose, via visual emailing interface 400, social content (e.g., email message 402). Through visual emailing interface 400, user 36 may compose email message 402 and address email message 402 to one or more email users (e.g. user 36). When composing emails, user 36 may select the email users to whom the email is directed. Accordingly, for example, social content (e.g., email message 402), may be directed to email users (e.g., user 38 and user 40).

While in the foregoing illustrative examples of an instant message and an email, the social content may be specifically addressed to one or more recipients who may be identified at the time that the social content is created, in other embodiments, consumers (e.g., second users, or recipients) of the social content may not be identified at the time at which the social content is created. For example, in the case of a blog post and/or a social networking post or update, various users may access the social content at various different times. In some embodiments, DSC process 10 determine one or more recipient characteristics of an accessing user when the user attempts to access the social content. Further, DSC process 10 may select 104 one of the plurality of status indicators to associate with the content for the second user based on the one or more rules in response to determining one or more recipient characteristics of an accessing user. In such an embodiment, the recipient characteristics may include an identity of the user (e.g., which may be determined based on log-in credentials associated with the user for a social networking application), an IP address associated with a computing device the accessing user is utilizing to access the social content, or another characteristic of the accessing user.

Email client application 400, alone or in combination with DSC process 10, may enable user 36 to send social content (e.g., email message 402) to users 38 and user 40, as defined within "to" field 404 of email message 402, e.g., by selecting the "send" button 406. Upon user 36 selecting "send" button 406, email client application 400, alone or in combination with DSC process 10, may send email 402 to the intended email users e.g., user 38 and user 40. In some situation, email message 402 may contain certain elements that user 36 (i.e., the sender) may wish to exercise some control over and/or may wish to vary depending upon the recipient. For example, status indicator 408 (e.g., which may include one or more of status indicators S1 through Sk) may be determined by certain criteria based on user 36 or on characteristics of the intended recipients of the email message (e.g., characteristics of users 38 and 40).

As discussed above, upon user 36 selecting "send" button 406, email message 402 from user 36 may be sent to users 38 and user 40. Assume for illustrative purposes that user 40 is the manager of user 36 in Company X and that user 38 is the spouse of user 36. Now assume that user 36 sends the same message (e.g., email message 402) to users 38 and 40. User 36 may wish for the social content (e.g., email message 402) that is sent to both users 38 and 40 to be associated with a status indicator (e.g., status indicators S1 to Sk, where k may include a finite number). For example, user 36 may wish for status indicator S1 to be associated with email message 402 sent to user 38 and for status indicator S2 to be associated with email message 402 to user 40. It is understood that status indicator 302 may be any one of the status indicators (e.g., S1 to Sk, where k is a finite number) or any combination thereof. The status indicator associated with the social content (e.g., email message 402) may be selected 104 based on one or more rules defined 102 for the plurality of status indicators 302 (e.g., plurality of status indicators S1 through Sk).

Status indicator 302 (e.g., one of the plurality of status indicator S1 to Sk) may be selected 104 to be associated with social content for a second user (e.g., one of users 38 and 40) based on the one or more rules. A variety of recipient characteristics may be utilized to determine what status indicator would be presented to that user. For example, a characteristic of the recipient may be a status of the user. The status of the user may, for example, define a relationship between the first user (e.g., user 36, who generates the social content) and the users to whom the content is provided. For example, in the above example, user 38 may be a spouse of user 36, and user 40 may be user 36's manager. The recipient characteristics may include various additional/alternative status information about the second user, such as a familial or social relationship (e.g., relative, child, parent, teacher, friend, acquaintance), a business status or relationship (e.g., boss, coworker, employee, customer), or other status. It is understood that although a status is used to depict the characteristic of the recipient, this is not intended to be a limitation of present disclosure, and other characteristics may be used. In the email example described above, user 36 may originate a social content (e.g., email message 402) and users 38 and 40 may be the recipients of email message 402. As described above, user 38 may receive email message 402 associated with status indicator S2 and user 40 may receive email message 402 associated with status indicator S3. In this example, DSC process 10 may select 102 the respective status indicators S2 and S3 based on, at least in part, the one or more rules defined 102 for the plurality of status indicators based on the respective recipient characteristics of user 38 and user 40. In some embodiments, user 36 may adjust and/or define one or more of the rules for the plurality of status indicators and/or the criteria that status indicators (e.g., status indicators S2 and S3) selection depends on. The sender (e.g., user 36) may populate a set of status indicators rules that dynamically adjust the selection of the status indicators (e.g., status indicators 302) based on the recipients (e.g. users 38 and 40) characteristics. For example, the sender may create the rules via one or more suitable mechanisms (e.g., a user interface, etc.). DSC process 10 may define 102 the rules based on the user populated set of status indicator rules. In some embodiments, one or more rules may be defined 102 based on a default set of rules.

In an embodiment, recipient characteristic may include a status of the second user. For example, status indicator 302 (e.g., status indicator S2) may depend on the status of user 38. In an embodiment, the status of the second user may include a status of the second user as an individual and/or a relationship status relative to the first user (i.e., relative to the creator of the social content). In an embodiment, the status of the second user may include an availability status associated with the second user. For example, the status of user 38 may be determined by social networking applications and/or suites, described above. For example if user 38 has a status of "busy," status indicator S2 may selected 104 based on a rule defined 102 for one or more status indicators based on user 38's "busy" status. It is understood that use of "busy" status is an example, and not to be construed as a limitation and other statuses may be also used.

In another embodiment, status indicator 302 may depend on prior status of user 38 or on random status of user 38. For example, user 38 may have a current status of "busy", however, a prior status may have been "do not disturb." DSC process 10 may select 104 status indicator 302 based on one or more rules defined 102 based on the prior status of user 38. Although specific examples are given of user 38 statuses are give in the example above, these are not to be considered as limitations, other statuses may also be used.

In an embodiment, DSC process 10 may define 102 one or more rules based on prior social content including an associated status indicator that the second user has received from the first user. For example, user 38 may have received multiple pieces of social content from user 36. Each piece of social content received from user 36 may have included an associated status indicator. DSC process 10, may select 104 status indicator 302 as being a next status indicator included on a list of status indicators, relative to the last status indicator received by user 38 from user 36. This list of status indicators may be associated with user 36 or associated with user 38. For example, DSC process 10 may define 102 a rule for the plurality of status indicators based on, at least in part, a last status indicator received by the second user. For example, DSC process 10 may define a rule generally, that the status indicator may equal the next status indicator in a list of status indicators relative to the last status indicator received by the second user. For example, assume that user 36 wished to send a piece of social content (e.g., email message 402) to another user (e.g., user 38). If user 36 had already sent other email messages to user 38, including associated status indicators (e.g., respective ones of status indicators S1 to Sk, where k in a finite number), user 36 may wish for different status indicators to be sent in subsequent emails to user 38. For illustrative purposes, assume that status indicator 302 is a quote that user 36 usually inserts in his or her email messages. This quote may change on an incremental basis, where DSC process 10 may select 104 a different quote (i.e., status indicator) to be sent to user 38. The selection 104 may be based on a next quote in a list of quotes defined by user 36 or associated with user 38. It is understood that the above is only an example, not a limitation, and other criteria for selecting different status indicators may be employed.

In another embodiment, the recipient characteristic may include a number of times the second user views the content. As generally described above, an originator of social content may control the status indicator being sent or viewed by a recipient based on a set of rules defined by DSC process 10 that may be associated with the originator and/or may be based on the recipient characteristics. For example, DSC process 10 may determine the number of times a user (e.g., user 38) have viewed a piece of social content (e.g., email message 402) that included status indicator 302 (e.g., status indicator S2). DSC process 10 may select 104, based on the number of views of the social content by user 38, a different status indicator based on one or more rules defined for the plurality of status indicators. For example, user 36 may create a rule, that may be defined 102 by DSC process 10, that every ten times another user views the social content created by user 36 that contained a status indicator, the status indicator may be changed to a different status indicator (e.g., by DSC process 10 selecting 104 a different status indicator than the current status indicator). It is understood that the above is only an example and not a limitation, other rules, number of views, social content, and status indicators may be used.

DSC process 10 may select 104 one of the plurality of status indicators to associate with the social content for a second user based on the one or more rules. As explained above, DSC process 10 may define 102 the one or more rules based on an input by an originator (e.g., user 36) of social content (e.g., social content 304). For example DSC process 10 may define 102 a number of rules associated with status indicators 302 (status indicators S1 to Sk where k in a finite number) based on characteristics of other users (e.g., users 38 and 40) or based on preferences of the originator (e.g., user 36). Using a social networking website as an example, user 36 may wish to set a rule that allows his or her social content created on, or posted to, the social networking website to contain a status indicator 302 to be displayed differently to other users. Assume for illustrative purposes that user 40 is the manager of user 36 in Company X and that user 38 is the spouse of user 36. User 36 may have a rule (e.g., which may be defined by DSC process 10 based on a user selection or input) that allows his status indicator to be displayed as "working hard" for user 40 (e.g., status indicator S2 may be selected 104 for user 40) but displayed as "miss you" displayed to user 36 (e.g., status indicator S1 may be selected 104 for user 38). Although, a social networking website is used as an example, this is not a limitation and other social networking applications may be used.

In an embodiment, selecting 104 one of the plurality of status indicators may include identifying 108 one or more exceptions based on the second user. For example, DSC process 10 may allow user 36 to create exceptions based on another user (e.g., users 38 and 40). The one or more exceptions may be based on, at least in part, the role of the second user, a group association of the second user, an identity of the second user, a demographic of the second user, and a relationship between the first user and the second user, as well as various additional/alternative bases. For example, a different status indicator 302 may be displayed based on whether the recipient belongs to a certain group of recipients that the content is appropriate for. For example DSC process 10 may define a rule that a particular status indicator 302 (e.g. status indicator S1) may be selected 104 and provided 106 to first time viewers of the social content, and may define an exception that another status indicator 302 (e.g., status indicator S2) may be selected 104 and provided 106 to first time viewers of the social content based on whether the recipient belongs to a certain group (e.g., a family group or a work group). for example status indicator S1 may be appropriate to be provided 106 to or viewed by a family member but not appropriate to be sent to or viewed by a work group member. According to such an embodiment, selecting 106 one of the plurality of status indicators based on the one or more rules may include identifying 108 any exceptions to the one or more rules defined 108 for the plurality of status indicators.

In another embodiment, user 36 may create an exception based on the identity of one or more of the recipients. For example, social content (e.g. social content 304) may be sent or viewed or accessed by Bob and Joe and status indicator S1 may be selected 104 and provided 106. However, if social content 304 is sent to Bob and Sue, status indicator S2 may be chosen. It is understood that the example above is only for illustrative purposes only and not meant as a limitation and other exceptions may be envisioned.

In an embodiment, the one of the plurality of status indicators may be selected 104 in response to the second user viewing the content one or more times. For example, if user 38 views a piece of social content (e.g., email message 402) that includes an associated status indicator 302 (e.g., status indicator S1) more than a defined number of times (e.g., views the email message a second time), a different status indicator may displayed to user 38 depending on the number of views. For example, DSC process 10 may define 102 a rule whereby status indicator S1 may change to status indicator S2 after user 38 views the email message three times. As explained above, one illustrative example status indicators 302 may be a quote. In such an example, if user 38 views the email message three times, a different quote may be displayed to user 38.

In one embodiment, the one or more defined 102 rules may be based on, at least in part, the number of times the content is manipulated. Content manipulation may include the number of times the content is forwarded, the number of times the content is replied to, the number of times the content is copied, the number of changes to the content, the number of times the content is tagged. For example, and as generally shown in FIG. 3, a user (e.g., user 36) may send a piece of social content (e.g., instant message 300) having an associated status indicator 302 (e.g., status indicator S1) to another user (e.g., user 38). DSC process 10 may define 102 a rule that is based on the number of forwards of the social content (e.g., instant message 300). The rule may be that if social content is forwarded by other users (e.g., user 38), the associated status indicator 302 (e.g., status indicator S1) may be changed to a different status indicator 302 (e.g., status indicator S3). As such, while user 38 may have received instant message 300 including associated status indicator S1, when user 38 forwards instant message 300 to user 42, DSC process 10 may select 104 status indicator S3. As such, instant message 300 may be provided to user 42 including associated status indicator S3. It is understood that the above is only an example of a rule based on content manipulation and this is not a limitation, other rules and manipulations may be used.

In other embodiments, DSC process 10 may select 104 status indicators 302 to be associated with social content at different stages of the creation of the social content. The one of the plurality of status indicators may be selected 104 when the content is viewed by the second user. The one of the plurality of status indicators may be selected 104 when the content is sent to second user. The one of the plurality of status indicators may be selected 104 in response to the second user being identified as a recipient of the content by the first user (e.g., when the first user enters the second user's email address in a recipient field, etc.). For example, DSC process 10 may select 104 status indicator S1 when user 36 creates instant message 300 or email message 402, at the time a recipient is determined (e.g., when user 36 identifies users 38 and 40 as recipients of instant message 300 or email message 402), or at the time instant message 300 or email message 402 is sent, and/or at the time instant message 300 or email message 402 is viewed by the recipient (e.g., viewed by user 38 or user 40). It is understood that the above is only an example and other status indicators may be used.

As explained above, DSC process 10 may also provide 106 the content and the selected 104 one of the plurality of status indicators to the second user. DSC process 10 may determine that a certain status indicator 302 (e.g., status indicator S1) may be associated with a certain social content (e.g., instant message 300 or email message 402). After this determination, DSC process 10 (alone and/or in combination with one or more other applications and/or processes) may display the social content to another user (e.g., user 38). Displaying the social content may involve the other user (e.g., user 38) viewing, reading or downloading the social content. It is understood that the above is only for illustrative purposes and other means for providing 106 of the social content to the second user.

Although particular examples have been presented in which the social content included an instant message and an email, it is understood that other means of social content may be used. Social content may be defined by social networking applications and/or suites, such as, for example IBM Lotus Connections, Microsoft SharePoint®, Facebook®, LinkedIn®, MySpace®, Twitter®, and Buzz®. SharePoint is a registered trademark of Microsoft Corporation in the United States, other countries, or both. Facebook is a registered trademark of Facebook, Inc. in the United States, other countries, or both. LinkedIn is a registered trademark of LinkedIn, Ltd. in the United States, other countries, or both. MySpace is a registered trademark of MySpace, Inc., in the United States, other countries, or both. Twitter is a registered trademark of Twitter, Inc. in the United States, other countries or both. Buzz is a registered trademark of Microsoft Corporation in the United States, other countries, or both. It is understood that the above social networking applications and suites are only examples and other social networking applications and suites may be used.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, DSC process 10 may be substituted for computing device 12 within FIG. 5, examples of which may include but are not limited to client electronic devices 28, 30, 32, 34.

Computing system 12 may include microprocessor 502 configured to e.g., process data and execute instructions/code for screen capture process 10. Microprocessor 502 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 504 may be configured to couple microprocessor 502 with various devices, such as keyboard 506, mouse 508, USB ports (not shown), and printer ports (not shown). Display adaptor 510 may be configured to couple display 512 (e.g., a CRT or LCD monitor) with microprocessor 502, while network adapter 514 (e.g., an Ethernet adapter) may be configured to couple microprocessor 502 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 502) of a general purpose computer/special purpose computer/other programmable data processing apparatus (e.g., computing device 12), such that the instructions, which execute via the processor (e.g., processor 502) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer readable storage medium having a plurality of instructions stored thereon, which when executed by a processor, cause the processor to perform operations comprising:
   determining a plurality of status indicators available to be associated with social content provided by a client device associated with a first user and connected to a network to communicate with at least a second user, wherein the first user and the second user access one or more applications over the network to generate the social content and facilitate social interaction;
   defining one or more rules for the plurality of status indicators based on, at least in part, on prior social contact between the first user and the second user, and one or more of a recipient characteristic, wherein the recipient characteristic represents an identifying characteristic of the second user and includes a number of times the second user views the content associated with a first status indicator, wherein the first status indicator is automatically added to the social content created by the first user;
   selecting a second status indicator of the plurality of status indicators to associate with the content for a second user based on the one or more rules, wherein the content is dynamically adjusted by associating the selected second status indicator with the content at the time of consumption of the content by the second user; and
   providing the content and the selected second status indicator of the plurality of status indicators to the second user based upon, at least in part, on prior social contact between the first user and the second user, and one or more of the recipient characteristic, wherein a client device associated with the second user accesses the one or more applications over the network to receive the dynamically adjusted content.

2. The computer program product of claim 1, wherein selecting of the plurality of status indicators includes identifying one or more exceptions based on the second user.

3. The computer program product of claim 2, wherein the one or more exceptions are based on, at least in part, one of a role of the second user, a group association of the second user, an identity of the second user, a demographic of the second user, and a relationship between the first user and the second user.

4. The computer program product of claim 1, wherein the content includes one of an instant message, an instant message status update, an email message, an email signature, and a social networking status update.

5. The computer program product of claim 1, wherein the recipient characteristic includes a status of the second user.

6. The computer program product of claim 1, wherein the one of the plurality of status indicators is selected in response to the second user viewing the content one or more times.

7. The computer program product of claim 1, wherein the one of the plurality of status indicators is selected when the content is sent to second user.

8. A computing system comprising:
- at least one processor device;
- at least one memory architecture coupled with the at least one processor;
- a first software module executable by the at least one processor and the at least one memory architecture, wherein the first software module is configured to determine a plurality of status indicators available to be associated with social content provided by a client device associated with a first user and connected to a network to communicate with at least a second user, wherein the first user and the second user access one or more applications over the network to generate the social content and facilitate social interaction;
- a second software module executable by the at least one processor and the at least one memory architecture, wherein the second software module is configured to define one or more rules for the plurality of status indicators based on, at least in part, on prior social contact between the first user and the second user, and one or more of a recipient characteristic, wherein the recipient characteristic represents an identifying characteristic of the second user and includes a number of times the second user views the content associated with a first status indicator, wherein the first status indicator is automatically added to the social content created by the first user;
- a third software module executable by the at least one processor and the at least one memory architecture, wherein the third software module is configured to select a second status indicator of the plurality of status indicators to associate with the content for a second user based on the one or more rules, wherein the content is dynamically adjusted by associating the selected second status indicator with the content at the time of consumption of the content by the second user; and
- a fourth software module executable by the at least one processor and the at least one memory architecture, wherein the fourth software module is configured to provide the content and the selected second status indicator of the plurality of status indicators to the second user based upon, at least in part, on prior social contact between the first user and the second user, and one or more of the recipient characteristic, wherein a client device associated with the second user accesses the one or more applications over the network to receive the dynamically adjusted content.

9. The computing system of claim 8, wherein selecting of the plurality of status indicators includes identifying one or more exceptions based on the second user.

10. The computing system of claim 9, wherein the one or more exceptions are based on, at least in part, one of a role of the second user, a group association of the second user, an identity of the second user, a demographic of the second user, and a relationship between the first user and the second user.

11. The computing system of claim 8, wherein the content includes one of an instant message, an instant message status update, an email message, an email signature, and a social networking status update.

12. The computing system of claim 8, wherein the recipient characteristic includes a status of the second user.

13. The computing system of claim 8, wherein the one of the plurality of status indicators is selected in response to the second user viewing the content one or more times.

14. The computing system of claim 8, wherein the one of the plurality of status indicators is selected when the content is sent to second user.

* * * * *